No. 100,920. PATENTED MAR. 15, 1870.

A. F. MURRAY & H. GREEN.
WATER WHEEL.

Witnesses:
Phil. T. Dodge
D. C. Pierce

Inventors,
A. F. Murray &
Henry Green
by Dodge & Munn
his attys.

United States Patent Office.

ALEXANDER F. MURRAY AND HENRY GREEN, OF MOLINE, ILLINOIS.

Letters Patent No. 100,920, dated March 15, 1870.

WATER-WHEEL.

The Schedule referred to in these Letters Patent and making part of the same

To all whom it may concern:

Be it known that we, ALEXANDER F. MURRAY and HENRY GREEN, of Moline, in the county of Rock Island, and State of Illinois, have invented certain Improvements in Water-Wheels, of which the following is a specification, reference being had to the accompanying drawings.

Our invention consists in a novel manner or form of constructing the buckets, whereby we produce a strong and simple wheel, in which we realize as large or a larger percentage of the force of the water than is done by any of the various complicated and expensive wheels hitherto the only kind in use.

In constructing our wheel we first provide two rims, $f$, of a circular form, and of equal diameter, and connect them at some distance apart to arms $e$, radiating from a central hub, $m$, as shown in both figures.

To and between these rims, at equal distances apart, we secure a series of vertical buckets, $g$. These buckets we make of a V-form, in their horizontal section, with their two sides or leaves of equal width, and forming a very acute angle to each other.

Figure 1:
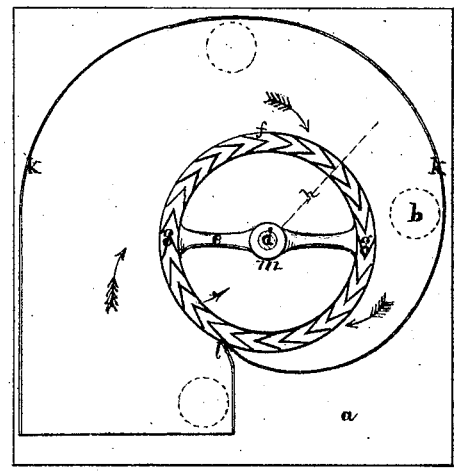
Figure 1 is a horizontal section through our wheel and its casing.
Figure 2:
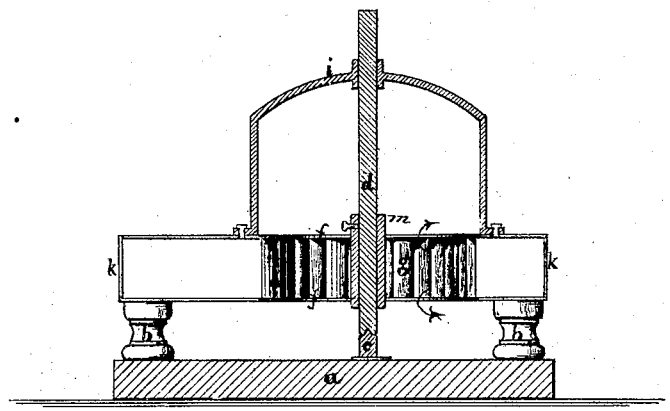
Figure 2 is a vertical cross-section of the same taken through the center.

The buckets are arranged with their front edges in the middle of the rim, and their back edges flush with the two sides of the same, and so that the front of one bucket and the back of the next will be in the same radial line from the center of the wheel, as shown at $h$, fig. 1.

The wheel thus constructed we secure to an axle passing through the hub $m$, and mount it in a scroll, so that the water can enter freely from all sides.

The water entering the wheel first impinges on the inner side of the outer leaf of the bucket, which serves as a traveling chute, and directs it against the inner leaf of the bucket, from which it reacts into the front edge and against the outer leaf, and then discharges on the inside of the wheel and passes off above and below.

Having thus described our invention,

What we claim is—

The herein-described water-wheel, having a series of vertical buckets, $g$, of V-shape, and acute-angled transversely, said buckets being so arranged that the apex of each bucket shall stand on the same radial line as the diverging rear edge of the bucket immediately in front thereof, substantially as described.

ALEXANDER F. MURRAY.
HENRY GREEN.

Witnesses:
M. L. ELDRIDGE,
W. L. CARROLL.